United States Patent [19]

Suzuki et al.

[11] Patent Number: 4,799,380

[45] Date of Patent: Jan. 24, 1989

[54] ENGINE ROTATION SPEED DETECTING APPARATUS

[75] Inventors: Toru Suzuki; Masahide Sakamoto; Akihito Watanabe, all of Katsuta, Japan

[73] Assignees: Hitachi, Ltd.; Hitachi Automotibe Engineering, both of Tokyo, Japan

[21] Appl. No.: 145,234

[22] Filed: Jan. 19, 1988

[30] Foreign Application Priority Data

Feb. 2, 1987 [JP] Japan ................... 62-20548

[51] Int. Cl.$^4$ ........................... G01M 15/00
[52] U.S. Cl. ............................. 73/116; 324/169
[58] Field of Search ............... 73/116, 117.3; 324/168, 324/169

[56] References Cited

FOREIGN PATENT DOCUMENTS

| 2800373 | 7/1979 | Fed. Rep. of Germany . |
| 2462821 | 2/1981 | France . |
| 3009966 | 9/1980 | Japan . |
| 83009 | 5/1984 | Japan ..................... 73/116 |

Primary Examiner—Jerry W. Myracle
Attorney, Agent, or Firm—Antonelli, Terry & Wands

[57] ABSTRACT

An engine rotation speed detecting apparatus comprises circuitry for sensing the state of operation of an engine, circuitry for setting a plurality of respectively different masking periods of time, circuitry for detecting an ignition signal lasting for a period of time longer than any one of the plural masking periods of time thereby detecting an ignition period defined between adjacent ignition signals, and circuitry for computing the rotation speed of the engine on the basis of the detected ignition period, one of the plural masking periods of time being selected according to the result of sensing by the operation state sensing circuitry.

5 Claims, 5 Drawing Sheets

F I G. 6
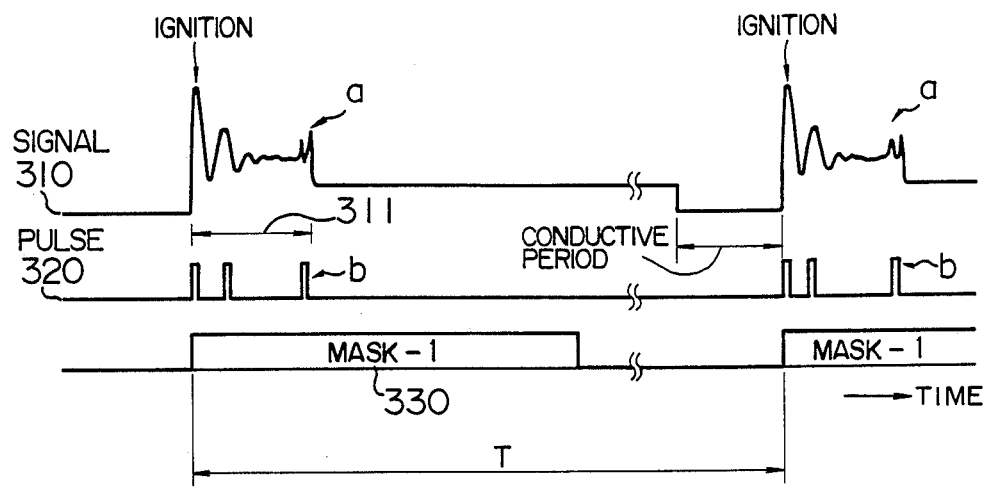
F I G. 7
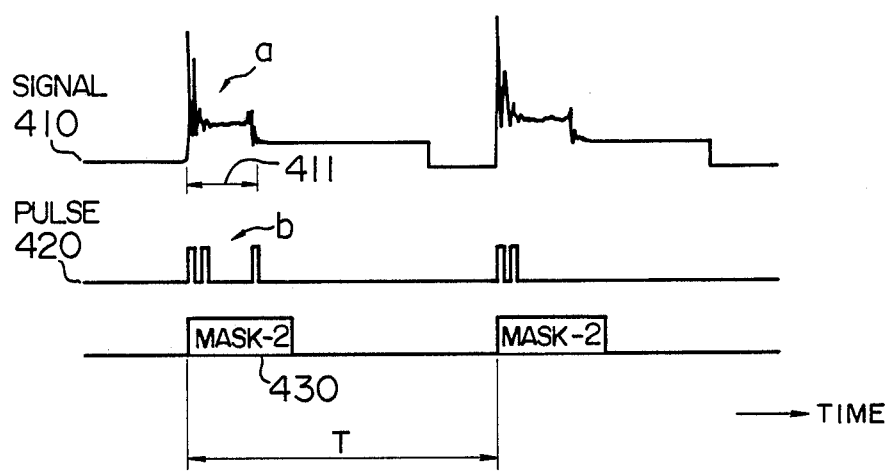

ENGINE ROTATION SPEED DETECTING APPARATUS

BACKGROUND OF THE INVENTION

This invention relates to an apparatus for controlling an internal combustion engine of spark ignition type, and more particularly to an apparatus suitable for detecting the rotation speed of an internal combustion engine such as a gasoline engine for automobiles.

In a gasoline engine for automobiles, the rotation speed of the engine is used in many cases as a data required for attainment of various controls including the control of the amount of fuel supplied to the engine.

Various methods for obtaining data of the engine rotation speed have been proposed hitherto and put into practical use. According to one of the known methods, the period of a voltage waveform appearing at the minus or negative terminal on the primary side of an ignition coil is measured, and the engine rotation speed is computed on the basis of the measured period of the voltage waveform.

However, the voltage waveform appearing at the primary side of the ignition coil includes generally considerably large fluctuations similar to chattering commonly known in the art, as shown in FIG. 1 (A). (The waveform fluctuations described above will be referred to hereinafter as chattering.) Therefore, when such a voltage waveform is shaped intact into a pulse signal as shown in FIG. 1 (B), a wrong period, as indicated by T' in FIG. 1 (B), will be measured, although an ignition timing interval T as shown in FIG. 1 (A) is the correct period.

A prior art practice which obviates such a trouble comprises shaping an output signal a of a signal source 101 such as an ignition coil into a pulse signal b by a ve shaping circuit 102, applying the pulse signal b to a one-shot multivibrator (abbreviated hereinafter as an OSM) 103, counting the output signal c of the OSM 103 by a counter 104, and measuring the period T on the basis of the output signal d of the counter 104. The symbol $\tau$ shown in FIG. 1 (C) designates the time constant of the OSM 103.

Thus, according to the prior art practice described above, the time constant $\tau$ of the OSM 103 acts to provide a masking period of time, that is, it exhibits a function of ignoring the pulses of the pulse signal b appearing in this masking period of time, so that the correct period T can be measured.

However, in the prior art practice in which the time constant of the OSM 103 is used to determine the masking period of time, no consideration is given to the fact that the time constant of the OSM 103 tends to be adversely affected by the accuracy, temperature dependence and secular variation of the circuit constant of the OSM 103.

On the other hand, a method has also been proposed in which the masking period of time is continuously changed by means of software. According to this method, the masking period of time at one ignition timing can be determined on the basis of the result of detection of the period T immediately before that timing.

An apparatus based on the latter method described above is disclosed in, for example, Japanese Patent Application No. 61-119250 (1986). In the disclosed apparatus, the length of the masking period of time is continuously changed depending on the engine rotation speed.

In the case of the former of the two period art methods described above, the accuracy of the masking period of time cannot be sufficiently maintained, and changes in the operating state of the engine are not taken into consideration. On the other hand, in the case of the latter method, a complex logic circuit is required so as to continuously determine the masking period of time which meets the operating state of the engine, but no consideration is given to the fact that a satisfactorily quick response cannot be ensured due to the requirement for provision of the complex logic circuit. Thus, when changes in the operating state of the engine are considered, both of these prior art methods have been difficult to detect the engine rotation speed with high accuracy without regard to the changes in the operating state of the engine.

SUMMARY OF THE INVENTION

It is an object of the present invention to provide an apparatus for detecting the rotation speed of an engine, which can sufficiently eliminate the adverse effect of chattering included in an ignition signal from an ignition coil and which can accurately detect the rotation speed of the engine without regard to any change in the operating state of the engine and without requiring any complex logic circuit.

According to the present invention which attains the above object, a plurality of predetermined masking periods of time for eliminating the adverse effect of the chattering are previously prepared, and a most suitable one of them is automatically selected in accordance with the operating state of the engine.

Thus, in the present invention, one of the predetermined masking periods of time is automatically selected depending on the operating state of the engine. Therefore, even when, for example, the engine is in its starting stage, the most suitable one of the masking periods of time can be selected so as to sufficiently eliminate the adverse effect of the chattering.

Further, since the masking period of time can be changed to that suitable for use in such an operating state of the engine by merely selecting it from among the previously prepared ones, no complex logic circuit for that purpose is required, and no delay in the response occurs.

BRIEF DESCRIPTION OF THE DRAWINGS

FIGS. 6 and 7 are waveform diagrams similar to FIG. 1 to show timings of ignition signals and different masking periods of time employed in the present invention.

DESCRIPTION OF THE PREFERRED EMBODIMENTS

Preferred embodiments of the engine rotation speed detecting apparatus according to the present invention will now be described in detail with reference to the drawings.

Figure 3:
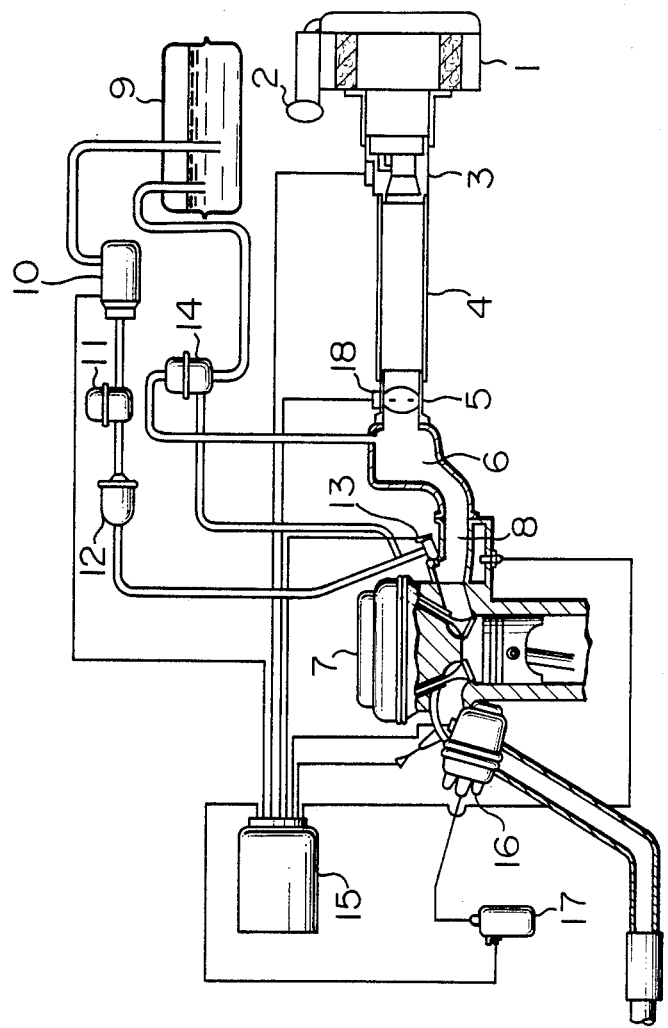
FIG. 3 is a diagrammatic view of an engine system to which an embodiment of the engine rotation speed detecting apparatus of the present invention is applied.

FIG. 3 shows a vehicle's engine system to which an embodiment of the present invention is applied. Referring to FIG. 3, intake air to be supplied to an internal combustion engine 7 flows from an inlet 2 of an air cleaner 1 into a collector 6 through a hot-wire type air flow sensor 3 detecting the amount of intake air, an air duct 4, and a throttle body 5 having a throttle valve controlling the amount of intake air. In the collector 6, air is distributed into a plurality of suction pipes 8 communicating directly with the respective cylinders of the engine 7.

On the other hand, fuel contained in a fuel tank 9 is pumped out and pressurized by a fuel pump 10 to be supplied to a fuel system which includes a fuel damper 11, a fuel filter 12, injectors 13 and a fuel pressure regulator 14. The pressure of fuel is regulated at a predetermined value by the fuel pressure regulator 14, and the fuel under regulated pressure is injected from the injectors 13 into the respective suction pipes 8.

The air flow sensor 3 generates an output signal representing the detected amount of intake air, and this output signal is applied to a control unit 15. An electronic control circuit including a microcomputer is incorporated in this control unit 15.

Further, a throttle sensor 18 mounted on the throttle body 5 generates an output signal representing the detected opening of the throttle valve, and this output signal is also applied to the control unit 15.

Ignition is controlled by a distributor 16 which controls an ignition coil 17. An ignition signal derived from the negative terminal on the primary side of this ignition coil 17 is also applied to the control unit 15.

In response to the application of the ignition signal derived from the negative terminal of the ignition coil 17, the control unit 15 computes the engine rotation speed on the basis of the voltage waveform appearing at the primary side of the ignition coil 17. For the purpose of computation of the engine rotation speed, the control unit 15 includes the microcomputer which executes a sequence of processing as shown in FIG. 4.

Figure 4:
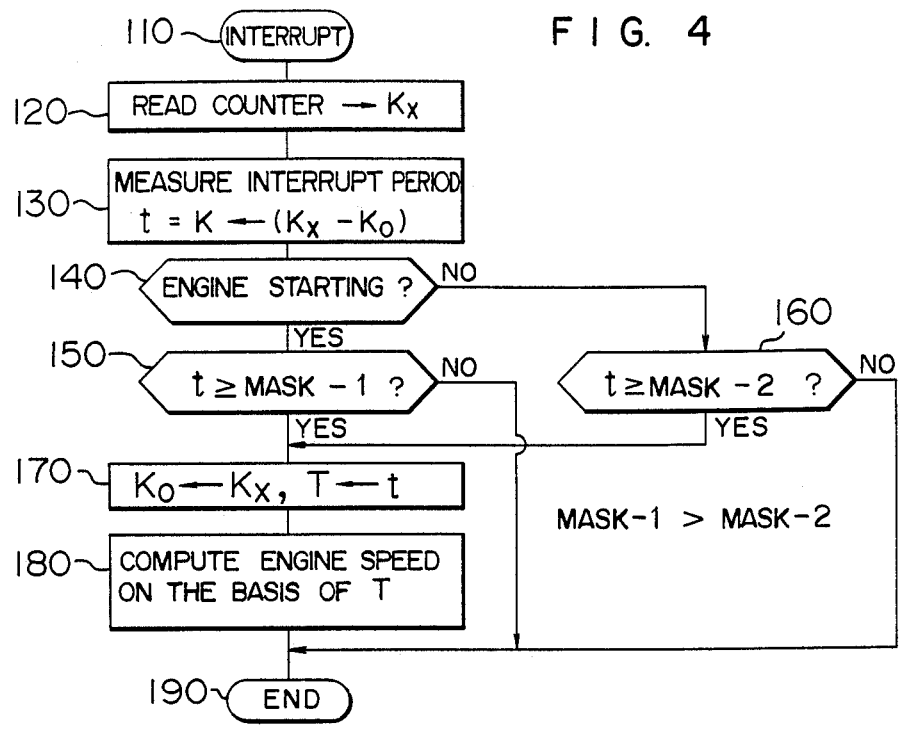
FIG. 4 is a flow chart illustrating the detecting operation of the apparatus of the present invention.

FIG. 4 shows the operation of the illustrated embodiment of the present invention. The operation of the embodiment of the present invention will now be described with reference to this FIG. 4 and also with reference to FIG. 5 which is a time chart.

Figure 1:
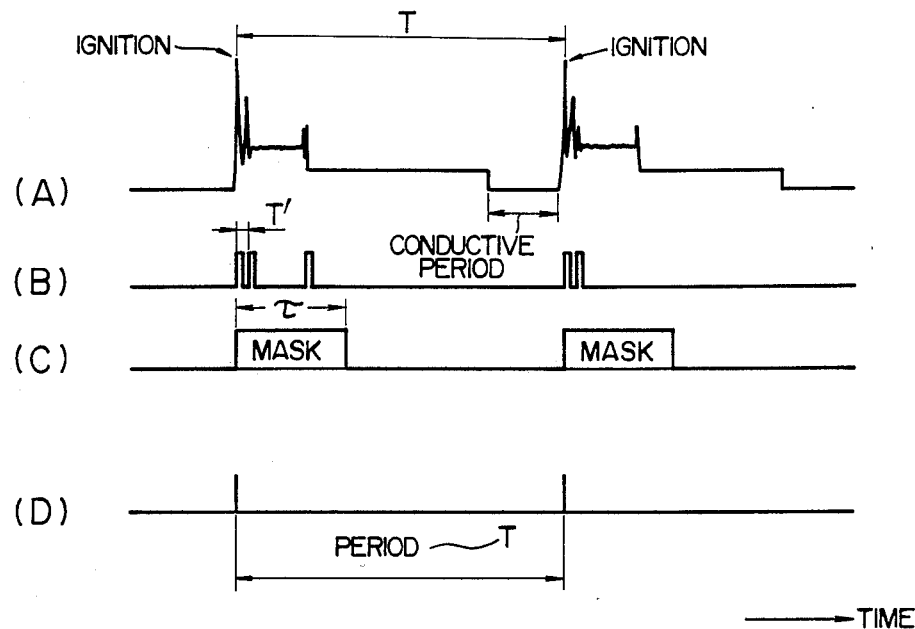
FIG. 1 is a waveform diagram showing timings of an ignition signal, a masking period of time and an ignition period in a prior art engine rotation speed detecting apparatus.
Figure 2:
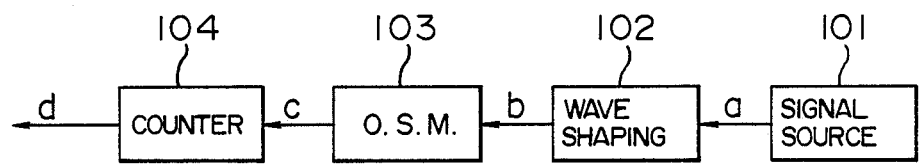
FIG. 2 is a block diagram of a prior art circuit used for detecting the engine rotation speed in a manner similar to that shown in FIG. 1.

The sequence of processing shown in FIG. 4 is executed by the control unit 15 which generates an interrupt signal each time a pulse of the pulse signal b (shown in FIG. 1 (B) and FIG. 2) appears as a result of shaping the voltage waveform of the ignition signal a derived from the primary side of the ignition coil 17. For this purpose, the microcomputer incorporated in the control unit 15 includes a wave shaping circuit such as that described with reference to FIG. 2, and the signal a from the ignition coil 17 is applied to the wave shaping circuit.

Figure 8:
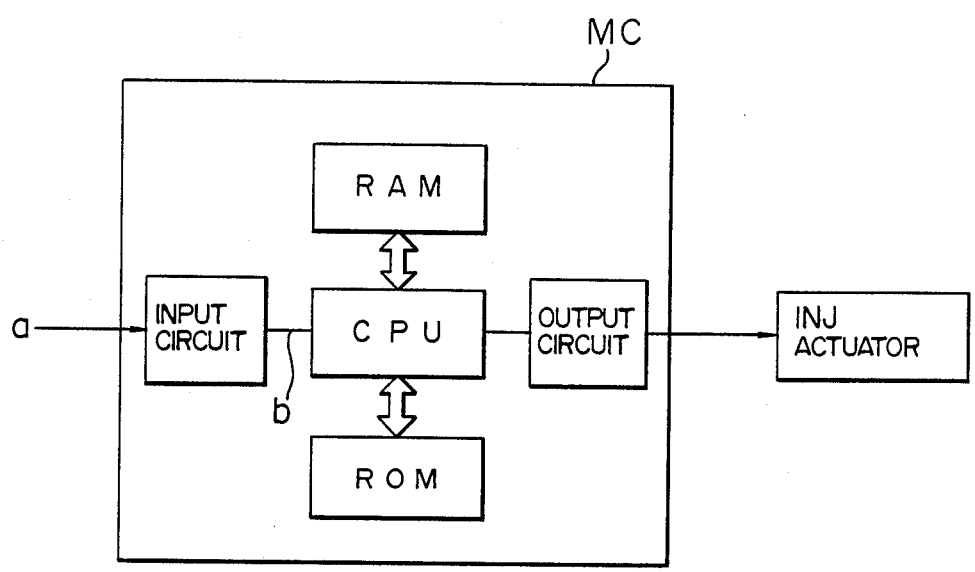
FIG. 8 is a block diagram showing schematically the structure of a microcomputer incorporated in the control unit of the present invention shown in FIG. 3.

More precisely, as shown in FIG. 8, the microcomputer MC incorporated in the control unit 15 includes an input circuit receiving the ignition signal applied from the signal source 101 (FIG. 2) of the ignition signal a and generating the wave-shaped signal b, a central processor unit CPU, a RAM, a ROM, and an output circuit generating an output signal for determining, for example, the amount of fuel to be injected on the basis of the computed engine rotation speed. An injector actuator for actuating the injectors INJ (not shown) is energized in response to the application of the output signal of this output circuit.

In the program shown in FIG. 4, an interrupt signal is applied in its first step 110. Then, in a step 120, the count of a counter is read, and its count data kx is stored. This counter may be a software counter utilizing the memory of the microcomputer MC incorporated in the control unit 15 or may be a hardware counter.

Figure 5:
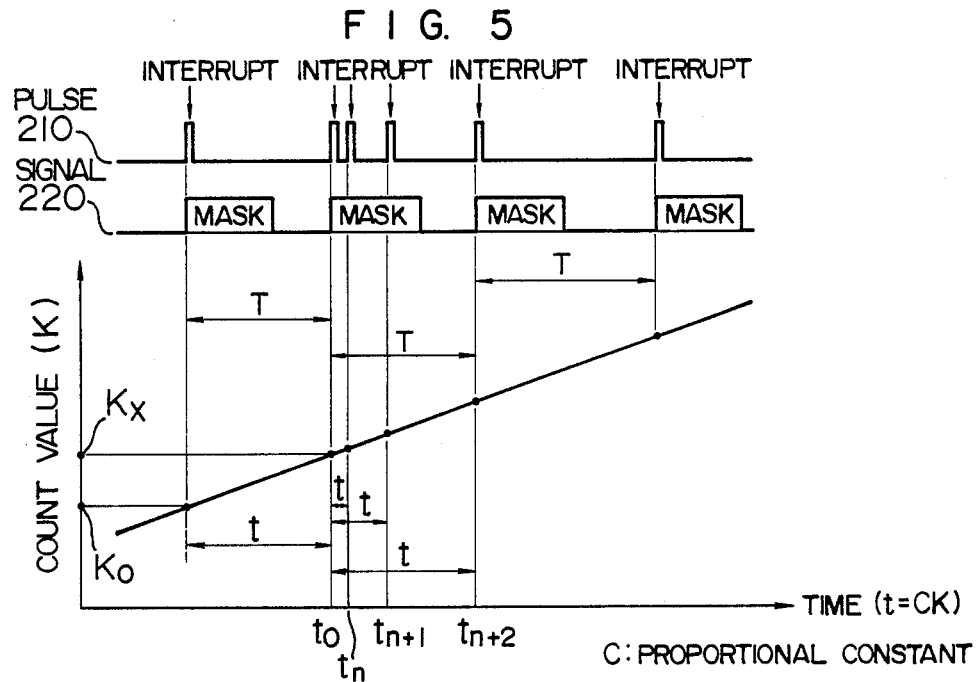
FIG. 5 is a time chart of the engine speed detecting operation shown in FIG. 4.

Then, in a step 130, the previous count data ko of the counter is subtracted from the present count data kx to compute the difference data k. This data k has a value proportional to a period of time t. That is, k is expressed as $k=ct$ as shown in FIG. 5. Hereinafter, this proportional constant c is ignored, and the data k is merely expressed as $k=t$.

Then, in a step 140, the operating state of the engine is checked. Herein, whether or not the engine is operating in its starting stage is checked in the step 140 by detecting the rotation speed of the engine. Depending on the result of checking in the step 140, execution of a step 150 or a step 160 is decided.

That is, when the result of checking in the step 140 proves that the engine is operating in its starting stage, whether or not the period of time t in FIG. 5 is equal to or longer than a first masking period of time MASK-1 is checked in the step 150. On the other hand, when the result of checking in the step 140 proves that the engine is not operating in its starting stage but is operating in its steady state to drive the vehicle, whether or not the period of time t is equal to or longer than a second masking period of time MASK-2 is checked in the step 160. There is the following relation between the MASK-1 and the MASK-2:

$$\text{MASK-1} > \text{MASK-2}.$$

When both the result of checking in the step 150 and the result of checking in the step 160 are "NO", the program jumps to a step 190 where the program is ended to wait for appearance of the next interrupt signal.

On the other hand, when the result of checking in each of the steps 150 and 160 is "YES", a step 170 is followed in which the period of time t and the data kx are selected as the ignition period T and the count data ko respectively. Then, in a step 180, the rotation speed of the engine is computed on the basis of the period T selected in the step 170.

The result of execution of the sequence of processing shown in FIG. 4 will be described with reference to FIG. 5. Referring to FIG. 5, each time a pulse 210 of the pulse signal applied from the primary side of the ignition coil 17 appears, an interrupt is instructed, and the processing program shown in FIG. 4 is started. Either the step 150 or the step 160 is executed, and a masking function as shown by a signal 220 is exhibited. Therefore, even when an interrupt is instructed in response to each of pulses of the pulse signal appearing within the masking period of time $\tau$, the processing for updating the ignition period T and computing the engine rotation speed on the basis of the updated period T is not executed. The processing for updating the ignition period T and computing the engine rotation speed on the basis of the updated period T is executed only when an interrupt is instructed in response to a pulse signal having a pulse period longer than the masking period of time $\tau$. Therefore, the adverse effect of chattering described with reference to FIG. 1 can be eliminated.

The period of time in which the detection of the engine rotation speed tends to be adversely affected by the chattering varies greatly depending on the operating state of the engine as described already.

Therefore, when the masking period of time $\tau$ is fixed, the masking effect may not be fully exhibited depending on the operating state of the engine as also described already, and the accurate rotation speed of the engine cannot be detected.

However, the rotation speed detection program employed in the embodiment of the present invention includes the steps 150 and 160 following the step 140 for selecting the optimum one of the masking periods of time depending on the operating state of the engine. Thus, the first masking period of time MASK-1 is selected when the engine is operating in its starting stage where the ignition timing interval is large, while the second masking period of time MASK-2 is selected when the engine is not operating in its starting stage but is operating in its steady state to drive the vehicle. As also described already, there is the relation

MASK-1>MASK-2 there between.

Therefore, according to the embodiment of the present invention, the masking period of time is automatically changed over depending on the operating state of the engine. In the case where the engine is in its starting stage and is rotating at a low speed, and chattering appears for a relatively long period of time in the pulse signal applied from the ignition coil 17, the first masking period of time MASK-1 which is relatively long is selected for the detection of the engine rotation speed. On the other hand, in the other case where the rotation speed of the engine is not so low, the second masking period of time MASK-2 which is relatively short is selected for the detection of the engine rotation speed. Thus, the adverse effect of the chattering can be reliably eliminated, and the accurate rotation speed of the engine can be always detected.

The above fact will be further explained with reference to FIGS. 6 and 7. FIG. 6 shows the case where the engine is operating in its starting stage. In this case, chattering appears in the ignition signal a from the ignition coil 17 for a relatively long period of time 311 as shown in a voltage signal waveform 310, and, as a result, pulses attributable to the chattering appear in the pulse signal b as shown in a pulse signal waveform 320 in FIG. 6. In such a case, the relatively long masking period of time MASK-1, as indicated by 330, is applied to sufficiently mask the pulses attributable to the chattering appearing over the relatively long period of time 311. Therefore, the accurate rotation speed of the engine can be reliably detected.

On the other hand, FIG. 7 shows the case where the engine is not operating in its starting stage but is rotating at a speed which is not so low. In this case, chattering appears in the ignition signal a from the ignition coil 17 for a relatively short period of time 411 as shown in a voltage signal waveform 410, and, as a result, pulses attributable to the chattering appear in the pulse signal b within the short period of time 411 only as shown in a pulse signal waveform 420 in FIG. 7. In such a case, the relatively short masking period of time MASK-2 is applied to mask the pulses attributable to the chattering. Therefore, failure of accurate detection of the engine rotation speed by application of an unnecessarily long masking period of time can be obviated, and the accurate rotation speed of the engine can be detected.

Thus, according to the illustrated embodiment of the present invention, not only the masking function by means of software is applied in addition to the masking function exhibited by the circuit including the OSM 103 (FIG. 2) which is a hardware means, but also the optimum masking period of time is selected from among plural settings depending on whether or not the engine is operating in its starting stage. Therefore, the most suitable masking function is always carried out, and the rotation speed of the engine can be reliably and accurately detected.

In the aforementioned embodiment, the masking period of time is selected depending on whether the engine is operating in its starting stage or not. However, it is apparent that the operating state of the engine may be further divided into more stages.

According to the present invention, an optimum one of a plurality of predetermined masking periods of time is automatically selected depending on the operating state of the engine, so that the problem of time-consuming processing for determining the optimum masking period of time to meet the operating state of the engine can be eliminated, and the problem of requirement for a complex logic circuit to ensure a sufficiently quick response to an abrupt change in the engine rotation speed can also be eliminated. Therefore, the adverse effect of chattering can be entirely eliminated, and the accurate rotation speed of the engine can be reliably detected.

We claim:

1. An engine rotation speed detecting apparatus comprising means for sensing the state of operation of an engine, means for setting a plurality of respectively different masking periods of time, means for detecting an ignition signal lasting for a period of time longer than any one of said plural masking periods of time thereby detecting an ignition period defined between adjacent ignition signals, and means for computing the rotation speed of said engine on the basis of said detected ignition period, one of said plural masking periods of time being selected according to the result of sensing by said operation state sensing means.

2. An engine rotation speed detecting apparatus according to claim 1, wherein said operation state sensing means senses whether said engine is operating in its starting stage or said engine is operating in its steady state to drive a vehicle.

3. An engine rotation speed detecting apparatus according to claim 2, wherein, when said engine is operating in its starting stage, said masking period of time applied to that operating state of said engine is longer than when said engine is operating in its steady state to drive the vehicle.

4. An engine rotation speed detecting apparatus according to claim 1, wherein said masking period setting means sets two kinds of respectively different masking periods of time.

5. An engine rotation speed detecting apparatus comprising means for sensing whether an engine is operating in its starting stage or said engine is operating in its steady state to drive a vehicle, means for setting two kinds of respectively different masking periods of time, means for detecting an ignition signal lasting for a period of time longer than any one of said two kinds of masking periods of time thereby detecting an ignition period defined between adjacent ignition signals, and means for computing the rotation speed of said engine on the basis of said detected ignition period, the longer one of said two kinds of masking periods of time being applied when said engine is operating in its starting stage, while the shorter masking period of time being applied when said engine is operating in its steady state to drive the vehicle.

* * * * *